O. WINKLER.
STEERING DEVICE FOR VEHICLES.
APPLICATION FILED OCT. 18, 1907.

968,303.

Patented Aug. 23, 1910.

Witnesses:

Inventor,
Otto Winkler,
By
Atty

UNITED STATES PATENT OFFICE.

OTTO WINKLER, OF KÖPENICK, GERMANY, ASSIGNOR TO GENERAL ELECTRIC COMPANY, A CORPORATION OF NEW YORK.

STEERING DEVICE FOR VEHICLES.

968,303.  Specification of Letters Patent.  Patented Aug. 23, 1910.

Application filed October 18, 1907. Serial No. 398,015.

*To all whom it may concern:*

Be it known that I, OTTO WINKLER, a subject of the Emperor of Germany, residing at Köpenick, Germany, have invented certain new and useful Improvements in Steering Devices for Vehicles, of which the following is a specification.

This invention relates to that class of steering devices for motor vehicles and the like in which a screw-threaded spindle causes a nut to travel to and fro, the movement of said nut being communicated through suitable connections to the steering wheels, rudder, or other directive element. In course of time the screw and the nut become worn, so that there is more or less lost motion between them, which seriously impairs the accuracy of the steering, and may give rise to accidents.

The present invention aims to overcome this difficulty by providing a way of taking up the wear. To this end, the nut is made in two sections connected by a suitable adjusting device by means of which said sections can be caused to approach or separate, and thus compensate for wear.

Figure 1:
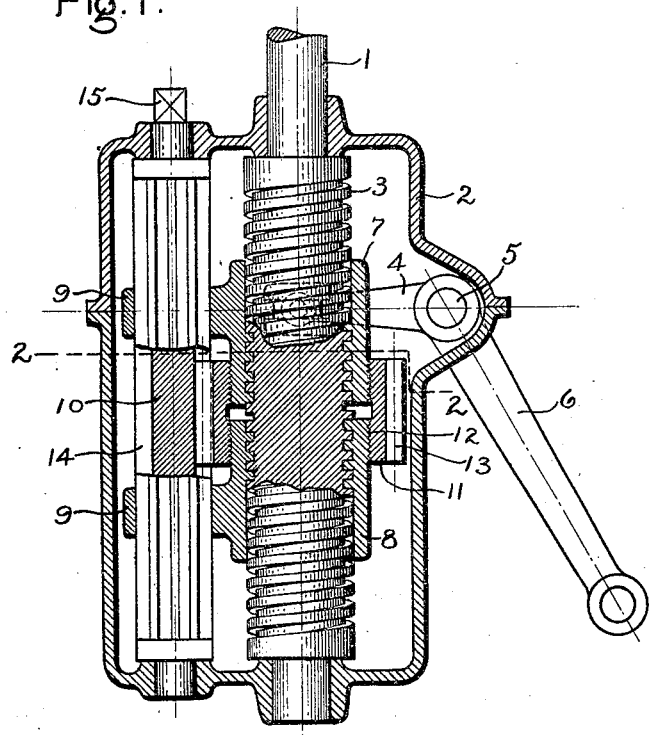
Figure 2:
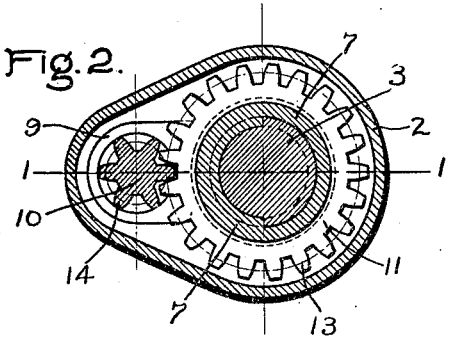

In the accompanying drawing, Figure 1 is a longitudinal section of the device, on the line 1—1, Fig. 2, and Fig. 2 is a section on the line 2—2, Fig. 1.

The steering post or spindle 1 is journaled in suitable bearings, preferably in the ends of a casing 2 which incloses the working parts. The spindle carries a worm or screw 3 which meshes with a traveling nut by means of which a rock-arm 4 is actuated. The rock-shaft 5 on which said arm is mounted, extends through the wall of the casing and carries an outside arm 6 from which connections are led to the steering wheels or other directive element.

The traveling nut is made in two sections 7 and 8, normally separated by a small space and each provided with an eye 9, which slides on a rod 10 arranged parallel with the screw. The two nut-sections 7—8 are rigidly connected by a device which permits them to be relatively displaced. The preferred device for this purpose is a sleeve 11 encircling the adjacent ends of the nut-sections and having internal screw-threads meshing with similar threads on one or both of the nut-sections. If both sections are screw-threaded, the threads 12 on the two sections and in the ends of the sleeve must be right and left-handed, so that a rotation of the sleeve will cause said sections to approach or separate.

In order to rotate the sleeve when the nut-sections need adjustment, said sleeve is provided with external teeth 13 which mesh with teeth 14 formed on the guide-rod 10 and extending practically the entire length of said rod to enable the nut and sleeve to travel lengthwise thereof. The guide-rod thus constitutes a long pinion, and one of its journals projects through one end of the casing and has a squared portion 15 to receive a wrench for rotating it when the nut-sections require adjustment.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. The combination of a screw, a nut engaging the screw which is made in sections, there being a space between the adjacent ends of the sections, a steering arm connected to one of said sections, threaded means engaging and connecting said adjacent ends, and a device for rotating said means to adjust the sections toward and from each other.

2. The combination with a screw, of a nut made in sections, there being a space between the adjacent ends of the sections, means for rigidly connecting said sections, and a device for actuating the means to adjust said sections toward and away from each other.

3. The combination with a screw, of a nut made in sections, a sleeve engaging said sections, and means for rotating the sleeve to adjust said sections lengthwise therein.

4. The combination with a screw, of a nut engaging the screw which is made in sections and is provided with external screw-threads, a right and left-hand screw-threaded sleeve engaging with said external screw-threads, and means for rotating the sleeve to adjust the sections relatively to each other.

5. The combination with a screw, of a nut engaging the screw which is made in sections and provided with external screw-threads, there being a space between the adjacent ends of the sections, a right and left-hand screw-threaded sleeve engaging with said external threads, and a guide-rod for said nut sections and the sleeve.

6. The combination with a screw, of a nut made in sections and having external screw-threads, a sleeve having internal screw-threads meshing with those on the nut sections, external teeth on said sleeve, and a rotatable guide-rod for said nut-sections having teeth meshing with those on said sleeve.

7. The combination with a shaft and a screw thereon, of a nut engaging the screw which is made in two sections, there being a space between the adjacent ends of the sections and oppositely inclined external screw-threads on said sections, a sleeve having internal screw-threads engaging with the external threads on the nut sections, there being external gear teeth on the sleeve, a casing inclosing the nut and screw which is provided with bearings for the shaft, and a guide-rod rotatably mounted in the casing which engages the nut sections to prevent their rotation with the screw and is provided with teeth meshing with the teeth on the sleeve, one end of the rod projecting through the wall of the casing to permit it to be rotated from the outside thereof to adjust the nut sections without taking the apparatus apart.

In witness whereof, I have hereunto set my hand this fifth day of October, 1907.

OTTO WINKLER.

Witnesses:
 JULIUS RUMLAND,
 KARL RICKEBEN.